United States Patent [19]

Yamamoto et al.

[11] 4,071,454
[45] Jan. 31, 1978

[54] HOLLOW POLYVINYL ALCOHOL FIBERS

[75] Inventors: Kohzo Yamamoto; Syuji Kawai; Akio Ohmori, all of Kurashiki, Japan

[73] Assignee: Kuraray Co., Ltd., Kurashiki, Japan

[21] Appl. No.: 722,024

[22] Filed: Sept. 10, 1976

[30] Foreign Application Priority Data

Sept. 19, 1975 Japan .................... 50-113276

[51] Int. Cl.$^2$ .............................................. B01D 13/00
[52] U.S. Cl. .......................... 210/321 A; 210/321 B; 210/500M; 264/185
[58] Field of Search ................ 210/321 B, 500 M, 22, 210/23, 321 A; 264/185, 205

[56] References Cited

U.S. PATENT DOCUMENTS

| | | | |
|---|---|---|---|
| 3,035,060 | 5/1962 | Binning et al. | 210/500 M X |
| 3,228,876 | 1/1966 | Mahon | 210/321 B X |
| 3,276,996 | 10/1966 | Lazare | 210/500 M X |
| 3,660,556 | 5/1972 | Ashikaga | 264/185 |
| 3,987,140 | 10/1976 | Mizobe et al. | 264/185 X |

Primary Examiner—Frank A. Spear, Jr.
Assistant Examiner—Richard W. Burks
Attorney, Agent, or Firm—Barry Kramer

[57] ABSTRACT

A dialysis membrane comprising a plurality of polyvinyl alcohol hollow fibers of substantially homogeneous structure having a degree of orientation ($\pi$) in the range of $60\% \leq \pi \leq 98\%$ and a degree of swelling ($\zeta$) in the range of $1.05 \leq \pi \leq 1.80$ times.

2 Claims, No Drawings

HOLLOW POLYVINYL ALCOHOL FIBERS

This invention relates to a dialysis membrane based upon polyvinyl alcohol (hereinafter referred to as PVA).

Increasing importance is now attached to the treatment of solutions containing alkalis, acids and/or salts. Such solutions are generated, for example, in the treatment of rayon, pulp, textiles (e.f. silky-finishing and silketting), pharmaceuticals, dairy products, brewery products, sugar, metals and the like. In the treatment of such materials, many processes such as pH adjustment, ion adjustment and dehydrative concentration may be effectively performed by dialysis. One of the techniques available for such treatment of aqueous alkali solutions, desalting, treatment of aqueous acid solutions, pH adjustment, ion adjustment, dehydrative concentration, and the like is one based on the use of a membrane. Recently, remarkable advances have been made in separation technology involving the use of membranes. By way of illustration, there may be cited a variety of techniques including reverse-osmosis, ultrafiltration, microfiltration, ion exchange, dialysis and the like. However, a great majority of the membranes heretofore employed exhibit inadequate resistance to chemicals, particularly to alkalis and acids, and only a few of the known membranes are of such in the recovery of alkalis or acids from solutions containing them. By way of example, a dialyzer using parchment paper has been employed for the treatment of aqueous alkali solutions containing hemicellulose (occasionally, iron compounds as well), as effluent from rayon plants, whereby the alkali is separated from the hemicellulose (where an iron compound is concomitantly present, hemicellulose and the iron compound). This procedure is based on the principle of dialysis which takes advantage of the difference in the concentration of the alkali as a driving force. However, the conventional dialyzers based on parchment paper have the following disadvantages:

1. Parchment paper has poor strength and, therefore, is subject to bursting.
2. This means that the membrane must be replaced frequently when the dialyzer is subjected to prolonged usage.
3. The paper can neither be cleaned nor be reused.
4. Because it is a flat membrane, the dialyzing unit must, of necessity, be large in size and expensive.

In another instance, ion exchange membranes are being employed in the metals industry for the treatment of aqueous acid solutions containing metallic ions. However, such ion-exchange membranes exhibit the following disadvantages:

1. Because they are flat membranes, the dialyzing apparatus must, of necessity, be large and expensive.
2. Flat membranes are difficult to handle.
3. Once broken, such membranes can never be repaired.
4. Such membranes are not necessarily resistant to all kinds of acids.
5. The permeability for acid obtainable is not as high as might be desired.

In addition to the above membrane-techniques including the treatment of aqueous solutions of acids and alkalis, there are known such techniques as reverse-osmosis, ultra-filtration, microfiltration, and the like for such purposes as desalting, pH adjustment, ion adjustment, dehydrative concentration and so forth. The most serious problems encountered in such applications include a decrease in flux attributable to the clogging of the membrane with the solutes and the resultant reduced service life of the membrane. In contrast, the methods employing dialysis membranes seem to be considerably advantageous because of their freedom from the above problems.

In addition, the use of hollow fibers for separation or purification purposes has been on the increase, and typical examples thereof are artificial kidneys and the desalination of sea water or brine. Hollow fibers are characterized by large surface area of contact and a high mechanical strength and, therefore, compared with flat membranes, the units incorporating such hollow fibers may be smaller in size and less costly to manufacture. Hollow fibers, in addition, offer a higher efficiency and can be easily built into any system.

Hollow polyvinyl alcohol fibers having a porous structure and a high water permeability have heretofore been developed. These hollow PVA fibers have been found very useful for the separation of high molecular weight substances with molecular weights not less than 10,000 from low molecular substances with molecular weights below 1,000, but are hardly useful for the separation of, for example, a substance having a molecular weight of 500 from a substance having a molecular weight of 100.

The present invention relates to dialysis membranes which are able to separate low molecular weight substances from each other, i.e., the membrane exhibits a low cut-off molecular weight. The dialysis membranes of the present invention comprise substantially homogeneous hollow PVA fibers which have a degree of orientation ($\pi$) of $60\% \leq \pi \leq 98\%$ and a degree of swelling $\zeta$ of $1.05$ times $\leq \zeta \leq 1.80$ times. The PVA hollow fiber employed according to the present invention is a substantially homogeneous fiber which has a degree of orientation $\zeta$ in the range of $60\% \leq \pi \leq 98\%$, more preferably $65\% \leq \pi \leq 96\%$, and a degree of swelling $\zeta$ in the range of $1.05$ times $\leq \zeta \leq 1.80$ times, more preferably in the range of $1.15$ times $\leq \zeta \leq 1.70$. This PVA hollow fiber is particularly remarkable in resistance to acids and alkalis and in permeability to alkalis, acids and salts. Moreover, the fiber has been found to be superior to the conventional hollow PVA fiber in mechanical strength, pressure resistance and resistance to aging due to prolonged dialysis in the presence of alkalis, acids and/or salts.

The term "substantially homogeneous membrane" means a membrane with a porosity undetectable by the electron microscope even at a magnification of 100,000 times. Where the degree of orientation is less than 60% or the degree of swelling is in the excess of 1.80 times, the hollow fiber is not only deficient in mechanical strength and pressure resistance but is vunerable to aging when subjected to prolonged dialysis of alkali, acid and/or salt, thus being liable to break. Where the degree of orientation is in excess of 98% or the degree of swelling is less than 1.05 times, the hollow fiber provides only a low rate of dialysis of alkali, acid or salt. The "degree of orientation" is determined as follows: using a Geiger Flex D-3F X-ray apparatus (Rigaku Denki K.K.), with an X-ray source of 40 KV, 15 MA and CuKα-rays, a sufficiently vacuum-dried PVA hollow fiber is subjected to a wide-angle X-ray diffraction. Based on the half width H of the intensity distribution measured along the Debye-Scherrer Ring [(101) (10$\bar{1}$), reflection (2 $\theta$ = 19.4°), the degree of orientation $\pi$ was calculated by the following equation:

$$\pi(\%) = (180-H/180) \times 100$$

The degree of swelling $\zeta$ is the ratio of the outer diameter of the cross-section of a hollow fiber when wet to that of the same fiber when dry. The outer diameter of a dry fiber is measured after the fiber has been kept for a whole day at room temperature (20° C) and in an atmosphere of R.H. 60%, while the outside diameter of a wet fiber is measured after the fiber has been kept in wter at 25° C. the whole day.

The following experimental data show the superior mechanical properties and permeability to alkali, acid or salt of the PVA hollow fiber according to the present invention.

| Degree of orientation | Degree of swelling (times) | Permeability (cm²/sec.) | | | Mechanical strength & aging (1) resistance |
|---|---|---|---|---|---|
| | | Sodium hydroxide | Sulfuric acid | Sodium sulfate | |
| 57 | 1.33 | — | — | — | x |
| 68 | 1.33 | 9.2 × 10⁻⁶ | 5.8 × 10⁻⁶ | 6.2 × 10⁻⁷ | Δ |
| 75 | 1.33 | 5.7 × 10⁻⁶ | 2.1 × 10⁻⁶ | 4.0 × 10⁻⁷ | o |
| 95 | 1.33 | 1.3 × 10⁻⁶ | 9.1 × 10⁻⁷ | 9.8 × 10⁻⁸ | o |
| 99 | 1.33 | 1.6 × 10⁻⁷ | 8.7 × 10⁻⁸ | 9.7 × 10⁻⁹ | o |
| 86 | 1.01 | 9.2 × 10⁻⁸ | 7.1 × 10⁻⁸ | 8.8 × 10⁻⁹ | o |
| 86 | 1.05 | 9.5 × 10⁻⁷ | 7.8 × 10⁻⁷ | 8.6 × 10⁻⁸ | o |
| 86 | 1.10 | 1.4 × 10⁻⁶ | 9.2 × 10⁻⁷ | 1.0 × 10⁻⁷ | o |
| 86 | 1.50 | 6.2 × 10⁻⁶ | 4.3 × 10⁻⁶ | 5.7 × 10⁻⁷ | o |
| 86 | 1.75 | 9.8 × 10⁻⁶ | 6.9 × 10⁻⁶ | 8.3 × 10⁻⁷ | Δ |
| 86 | 1.85 | — | — | — | x |
| 86 | 2.00 | — | — | — | x |

(1) o = excellent, Δ = good, x = insufficient for use

The outer diameter of the PVA hollow fiber used in the above experiments has an outer diameter of 360μ and a wall thickness of 50μ. As to the experimental procedure, 160 PVA hollow fibers being 30 cm. long were bundled and cemented together with an adhesive to prepare a PVA hollow fiber bundle having a total surface area of about 450 cm². Water was passed externally to the above PVA hollow fiber bundle, while aqueous solutions of sodium hydroxide, sulfuric acid or sodium sulfate, each at a 1.5 molar concentration, were respectively introduced internally to the fiber. After a predetermined time, the amount of permeated sodium hydroxide, sulfuric acid or sodium sulfate was determined and the permeability of the membrane to each solute was calculated. The temperature of each aqueous solution and of the water was adjusted to 30° C.

By means of the above PVA hollow fiber bundle, one may effect dialysis of alkalis, acids or salts from various solutions containing them. A dehydrative concentration of aqueous solutions, taking advantage of the osmotic pressures of solutes in solutions (containing a water-miscible organic solvent), may also be accomplished by passing the solution to be dialyzed and an aqueous solution separately, i.e., externally and internally or vice versa, to the PVA hollow fiber bundle. Therefore, with the present hollow fiber, the recovery or removal of alkalis, acids or salts from solutions containing them, pH adjustment, ion adjustment and dehydrative concentration of aqueous solutions may be successfully accomplished. Thus, for example, the hollow fiber finds application in such industries as food, fiber, chemical, dyeing, petroleum, metal, fermentation industries and the like. For use in food, fermentation and other industries, it is preferable to employ the PVA hollow fiber which has been treated with periodic acid, formaldehyde, glutaldehyde or the like, to make PVA insoluble and subsequently boiled. The solutions to be dialyzed according to the present invention include the solutions of alkalis, acids and/or salts containing compounds which have larger molecular weights than those of said alkalis, acids or salts, such as the compounds of metals such as iron, aluminum, nickel, chromium, uranium and the like; inorganic compounds such as salts, e.g. sodium chloride, sodium sulfate, and the like; and/or natural or synthetic organic compounds which have larger molecular weights than those of said alkalis, acids and salts. The term "alkali" means such agents as sodium hydroxide, potassium hydroxide, magnesium hydroxide, calcium hydroxide, ammonium hydroxide and so forth. The term "acid" means inorganic acids such as hydrochloric acid, sulfuric acid, phosphoric acid, nitric acid, and the like as well as organic acids such as acetic acid, formic acid, citric acid, tartaric acid, phenolic acid, and the like; and the term "salt" means such salts as sodium chloride, sodium sulfate and the like. The aqueous solutions need not be those containing a single kind of alkali, acid or salt but may contain two or more kinds thereof. The solvent may be water in many cases but the hollow fibers of the present invention are applicable to water-miscible organic solvents as well.

Dialysis using the present PVA hollow fibers may comprise contacting either the external or internal surface of the hollow fibers with said alkali, acid or salt solution so as to dialyze the alkali, acid or salt through the membrane. However, in cases where any other substance in said alkali, acid or salt solution would precipitate due to changes in the concentration of alkali, acid or salt in the course of dialysis, it is preferable to dialyze the alkali, acid or salt by contacting said alkali, acid or salt solution with the external surface of the hollow fiber for prevention of the precipitation. It is also advisable to pass two solutions, one to be dialyzed and the other to dialyze, in a counter-current manner. However, it is not essential to employ such counter-current techniques, and, for example, dialysis may be effected by submerging the PVA hollow fibers in a vessel containing an alkali solution and passing a solution for recovery of the alkali from said alkali solution into the interior of the hollow fiber.

A membrane with a porous structure has, as aforesaid, a large cut-off molecular weight and, therefore, cannot be employed in dialysis for separating comparatively low molecular weight substances from each other. Moreover, a conventional homogeneous PVA hollow fiber as described in Japanese Patent Publication No. 8918/1956, is prepared by wet-spinning the PVA spinning dope and subjecting the resultant fiber to hot drawing, wet-heat treatment and acetalization, and cannot be employed for the purposes of the present invention.

The PVA hollow fibers of the present invention having a degree of orientation in the range of 60% ≦ $\pi$ ≦ 98% and a degree of swelling $\zeta$ in the range of 1.05 ≦ $\zeta$ ≦ 1.80 times can be produced, for example by the following procedure: The PVA spinning dope is extruded from an annular nozzle with a clearance between the orifice diameter and the outer diameter of the nozzle therein of at least 0.3 mm into a coagulation bath at a predetermined bath-draw ratio (the ratio of the withdrawal velocity of the fiber from the bath to the velocity of the dope extruded; the drawing is accomplished in the coagulation bath). If necessary, the resultant fiber is drawn between rollers, treated with dry hot air at 100° to 205° C, preferably at 100° to 190° C, or with wet heat at 70° to 120° C, preferably 80° to 100° C, hot drawing (0 to 50%, preferably 0 to 30%) and/or formalized.

The degrees of orientation and swelling of the PVA hollow fibers obtainable by the methods described hereinabove should be brought to values within the aforementioned ranges by controlling the post-treatment conditions.

The PVA polymers suitable for use in the present invention include PVA with an average degree of polymerization in the range of 500 to 3500 and a degree of saponification in the range of 85 to 100 mole percent, modified PVA such as partially acetalized PVA, and copolymers of vinyl alcohol with not higher than 50 mole %, preferably not higher than 20 mole %, of ethylene, vinyl pyrrolidone, vinyl chloride, methyl acrylate, acrylonitrile, itaconic acid or the like. If necessary, the spinning dope may be blended with various additives such as water-soluble high polymers and aqueous emulsions.

Furthermore, dialysis can be easily performed with PVA hollow fibers having on outer diameter in the range of 20μ to 1500μ, preferably in the range of 40μ to 1000μ. The smaller the outer diameter of the hollow fiber, the easier it is to reduce the thickness of the membrane while retaining given mechanical strength and pressure resistance. However, with an outer diameter below 20μ, the pressure loss of the fluid flowing inside the hollow fiber increases and the membrane readily becomes clogged. On the other hand, with an outer diameter over 1500μ, undesirable results are encountered such as the collapsing of the bore of the hollow fiber, increased manufacturing difficulties, an increased thickness of the membrane which reduces permeability of the membrane to alkali, acid and/or salt, a reduction in packing the hollow fibers within the vessel and so forth.

The PVA hollow fibers according to the present invention may be assembled, in dry condition, into a dialysis apparatus. Alternatively, it is possible to carry out the entire production sequence from the production of PVA hollow fibers through the packing thereof into a dialyzing cell and fabrication of a dialyzing apparatus, all in wet condition.

As described hereinbefore, with PVA hollow fibers having the prescribed degree of orientation and of swelling, it is possible to conduct a dialysis of solutions containing alkali, acids and/or salts. For example, the present hollow fibers are particularly effective in the separation of sodium hydroxide and hemicellulose (where iron compounds are also present, said substances and the iron compounds) from solutions containing them which are effluents from the rayon production process, mercerizing process or pulp-making process, and the separation of alkali and degradation products of polyester fiber from solutions containing them which are effluents from the process for mercerization of polyester fibers. In the separation of alkali and hemicellulose from a solution containing them, prolonged runs lasting about a year, have been performed at an alkali recovery rate of 98% and hemicellulose and iron compound refuse rates of 98%, respectively.

The alkali recovery rate is calculated by means of the following equation:

$$\text{Alkali recovery rate (\%)} = \frac{\text{Amount of alkali in recovered solution}}{\text{Amount of alkali in solution to be treated}} \times 100$$

The hemicellulose rejection rate is calculated by means of the following equation:

$$\text{Rejection rate (\%)} = \frac{\text{Amount of hemicellulose in waste solution}}{\text{Amount of hemicellulose in solution to be treated}} \times 100$$

The aforementioned "solution to be treated" means a solution to be dialyzed containing an alkali and hemicellulose. The term "recovered solution" means a solution in which the alkali has been recovered by dialysis, and the term "waste solution" is the solution from which the alkali has been removed by dialysis. The terms "recovery rate", "rejection rate", "recovered solution" and "waste solution" can be applied to acid or salt solutions and have the same meanings as defined above for alkalis. Another pertinent application is the separation of metal ions, and acids from aqueous acid solutions containing metal ions. The separation of sulfuric acid and iron ions from an aqueous solution containing sulfuric acid and iron ions is another pertinent application. The separation of acid from solutions of organic compounds, desalting of solutions of organic compounds, desalting of solutions of organic compounds and dehydrative concentration of aqueous solutions are still other examples of the utility of the dialysis membrane according to the present invention.

The practical advantages of the PVA hollow fiber dialysis membrane according to the present invention are that it is resistant to alkali and acids, exhibits excellent permeability to alkali, acids and salts, permits easy reduction in size and manufacturing costs of the dialyzing apparatus, and can be fabricated into a closed system.

The following examples further illustrate the present invention. Unless otherwise stated, all percentages and parts are by weight.

EXAMPLES 1 AND 2

PVA with a degree of saponification of 99.9 mole % and an average degree of polymerization of 1700, boric acid, polyethylene glycol (PEG) with a molecular weight of 1000, acetic acid and a surfactant were dissolved together with heating to prepare an aqueous solution containing 20% of PVA, 20% based on PVA of PEG, 1.5% based on PVA of boric acid, 0.4% based on PVA of acetic acid and 0.1% based on PVA of sodium laurylsulfate. This aqueous solution was thoroughly defoamed and extruded from a nozzle with 24 annular orifices wherein an orifice diameter is 1.4 mm and a needle outer diameter is 0.4 mm. While air was introduced into the needle bores at a rate of 33 cc/min., the above defoamed PVA spinning dope was extruded from the annular orifices at a rate of 33 cc/min. The above defoamed PVA spinning dope was extruded from the annular orifices at a rate of 110 g/min. into an aqueous coagulation bath comprising 100 g/l of sodium hydroxide and 210 g/l of sodium sulfate. The resultant fiber was withdrawn from the bath at a speed of 9 m/min. and drawn between rollers to a draw ratio of 100% and neutralized with an aqueous solution of sulfuric acid and sodium sulfate. Following the treatment with sodium sulfate, the fiber was dried. The resultant hollow fiber was of uniform concentricity and had an outer diameter of 360μ, a wall thickness of 55μ, a degree of orientation of 81% and a degree of swelling of 1.41 times. 21,000 of the above PVA hollow fibers, each 200 cm. long, were packed into an acrylic resin pipe which is 200 cm long and 15 cm in inside diameter, and both ends were cemented with an adhesive to fabricate a vertical dialyzing apparatus having a total membrane area of about 40 cm². The apparatus was so arranged that a solution of sodium hydroxide containing hemicellulose would flow externally of the hollow fiber, and water would flow internally of the fiber, so that the fiber bore would not be clogged with deposits of the hemicellulose and so that it would be easier to rinse the membrane. Moreover, to achieve an improved dialyzing efficiency, a concentration gradient of sodium hydroxide was established within the dialyzing cell in a vertical direction. Thus, the sodium hydroxide solution containing hemicellulose was introduced from the bottom of the apparatus while water was passed from the top, and the sodium hydroxide solution recovered being withdrawn from the bottom.

The results of dialysis are given in Table 1.

Table 1

| | | Example 1 | Example 2 |
|---|---|---|---|
| Solution to be treated | Flow rate (cc/min) | 500 | 600 |
| | Concentration of sodium hydroxide (g/l) | 210 | 210 |
| | Concentration of hemicellulose (g/l) | 26 | 26 |
| Solution recovered | Flow rate (cc/min) | 1300 | 1000 |
| | Concentration of sodium hydroxide (g/l) | 80.3 | 116.0 |
| | Concentration of hemicellulose (g/l) | 0.2 | 0.3 |
| Waste solution | Flow rate (cc/min) | 650 | 800 |
| | Concentration of sodium hydroxide (g/l) | 1.0 | 13.5 |
| | Concentration of hemicellulose (g/l) | 19.6 | 19.1 |
| Recovery rate of sodium hydroxide (%) | | 99 | 92 |
| Rejection rate of hemicellulose (%) | | 98 | 98 |

CONTROL EXAMPLES 1 AND 2

Hollow fibers obtained by the procedure of Example 1 were heat-treated in an atmosphere of $N_2$ at 210° C for 10 minutes. The resultant hollow fibers exhibited a degree of orientation of 91% and a degree of swelling of 1.02 times. The heat treated hollow fibers were assembled into a vertical dialyzing apparatus as in Example 1 and dialysis was conducted using the same solution as that used in Example 1. The results are set forth in Table 2.

Table 2

| | | Control Example 1 | Control Example 2 |
|---|---|---|---|
| Solution to be treated | Flow rate (cc/min) | 500 | 700 |
| | Concentration of sodium hydroxide (g/l) | 210 | 210 |
| | Concentration of hemicellulose (g/l) | 26 | 26 |
| Solution recovered | Flow rate (cc/min) | 1470 | 2060 |
| | Concentration of sodium hydroxide (g/l) | 7.5 | 7.0 |
| | Concentration of hemicellulose (g/l) | 0 | 0 |
| Waste solution | Flow rate (cc/min) | 530 | 140 |
| | Concentration of sodium hydroxide (g/l) | 177 | 179 |
| | Concentration of hemicellulose (g/l) | 24.5 | 24.6 |
| Recovery rate of sodium hydroxide (%) | | 11 | 10 |

Table 2-continued

| | Control Example 1 | Control Example 2 |
|---|---|---|
| Rejection rate of hemicellulose (%) | 100 | 100 |

It will be seen from Table 2 that the PVA hollow fibers having physical properties outside the ranges of the present invention are not satisfactory, providing only low sodium hydroxide recovery rates.

EXAMPLE 3

PVA with a degree of saponification of 98.5 mole % and an average degree of polymerization of 1700, sodium sulfate and a surfactant (sodium lauryl sulfate) were dissolved with heating to prepare an aqueous solution comprising 22% of PVA, 10% based on PVA of sodium sulfate and 0.5% based on PVA of surfactant. The solution was thoroughly defoamed and extruded from the same annular orifices as that used in Example 1 (orifice diameter: 1.4 mm; the outer diameter of needle: 0.4 mm) into a coagulation bath identical with that used in Example 1. The resultant fiber was withdrawn from the bath at a speed of 8 m/min., drawn between rollers to a draw ratio of 200%, neutralized with acid and dried. In a bath having a sulfate concentration of 300 g/l, the fiber was treated under no tension at 95° C for 60 minutes. The resultant fiber was a hollow fiber with uniform concentricity having an outer diameter of 340μ, a wall thickness of 45μ, a degree of orientation of 91% and a degree of swelling of 1.16 times. 1600 of the above hollow fibers, each 200 cm. long, were packed into a vertical dialyzing cell, having an inside diameter of 5 cm. and being 200 cm. long, to fabricate a vertical dialyzing apparatus with a total membrane area of about 3 m². Using this vertical dialyzing apparatus, sulfuric acid and ferrous sulfate were separated from solutions containing them. The same dialyzing procedure as that described in Example 1 was followed. The aqueous sulfuric acid solution containing ferrous sulfate was introduced from the bottom of the dialyzing unit and water was passed from the top of the unit, whereby the recovered acid solution was withdrawn from the bottom. The results of dialysis are set forth in Table 3.

Table 3

| | | Example 3 |
|---|---|---|
| Solution to be treated | Flow rate (cc/min) | 130 |
| | Concentration of sulfuric acid (g/l) | 215 |
| | Concentration of ferrous ion (g/l) | 54 |
| Solution recovered | Flow rate (cc/min) | 113 |
| | Concentration of sulfuric acid (g/l) | 176 |
| | Concentration of ferrous ion (g/l) | 1.8 |
| Waste solution | Flow rate (cc/min) | 150 |
| | Concentration of sulfuric acid (g/l) | 53.7 |
| | Concentration of ferrous ion (g/l) | 45.4 |
| Recovery rate of sulfuric acid (%) | | 71 |
| Rejection rate of ferrous ion (%) | | 97 |

EXAMPLE 4

By a procedure similar to that described in Example 1, there was obtained a hollow fiber with uniform concentricity, having an outer diameter of 360μ, a wall thickness of 55μ, a degree of orientation of 81% and a degree of swelling of 1.41 times. 1600 of the above PVA hollow fibers, each 200 cm. long, were packed into a pipe, 200 cm. long and having an inside diameter of 5 cm. both ends being cemented with an adhesive, to fabricate a vertical dialyzing apparatus having a total membrane area of about 3 m². Using the above dialyzing apparatus, sodium chloride was removed from an amino acid tryptophan solution. As in Example 1, the amino acid (tryptophan) solution was introduced externally of the hollow fiber, with water being passed internally of the fiber. The results of dialysis are set forth in Table 4.

Table 4

|  |  | Example 5 |
|---|---|---|
| Solution to be treated | Flow rate (cc/min) | 50 |
|  | Concentration of amino acid (g/l) | 1.8 |
|  | Concentration of sodium chloride (g/l) | 19.2 |
| Waste solution | Flow rate (cc/min) | 70 |
|  | Concentration of amino acid (g/l) | 1.3 |
|  | Concentration of sodium chloride (g/l) | 0.6 |
| Recovered solution | Flow rate (cc/min) | 130 |
|  | Concentration of amino acid (g/l) | 0.008 |
|  | Concentration of sodium chloride (g/l) | 7.3 |
| Amino acid recovery rate (%) |  | 99 |
| Desalting rate (%) |  | 99 |

EXAMPLE 5

By a procedure similar to that described in Example 1, a hollow fiber was spun, drawn between rollers to a draw ratio of 100%, neutralized and dried. To prevent extractive loss of the PVA, the above PVA hollow fiber was insolubilized in an aqueous solution containing 0.3 weight % of periodic acid, 10 weight % of sulfuric acid and 15 weight % of sodium sulfate at 50° C for 2 hours. The fiber was then immersed in hot water at 95° C for 1 hour, whereby the soluble PVA in the fiber was removed. The resultant product was a hollow fiber with uniform concentricity, having an outer diameter of 350$\mu$, a wall thickness of 51$\mu$, a degree of orientation of 83% and a degree of swelling of 1.47 times.

2100 of the above PVA hollow fibers, each 200 cm. long, were incorporated in a pipe, 200 cm. long and having an inside diameter of 10 cm. both ends being cemented with an adhesive, to fabricate a vertical concentrating apparatus having a total membrane area of about 4 m².

Using the above dehydrative concentrating apparatus, apple juice was concentrated against an aqueous solution of sucrose (500 g/l).

Thus, as the apple juice and aqueous sucrose solution was introduced each at a rate of 100 cc/min., there were recovered the concentrated juice at a rate of 37 cc/min. and the water aqueous sucrose solution at a rate of 163 cc/min., the product being an apple juice concentrate 2.7 times as concentrated as the original juice.

What is claimed is:

1. A polyvinyl alcohol hollow fiber of substantially homogeneous structure having a degree of orientation ($\pi$) in the range of $60\% \leq \pi \leq 98\%$ and a degree of swelling ($\zeta$) in the range of $1.05 \leq \zeta \leq 1.80$ times, said fiber produced by extruding a polyvinyl alcohol spinning dope from an annular nozzle, said nozzle having a clearance between orifice diameter and its outer diameter of at least 0.3 mm, into a coagulation bath, and drawing the resultant hollow fiber in the coagulation bath.

2. A dialysis membrane comprising a plurality of polyvinyl alcohol fibers as defined in claim 1.

* * * * *